(12) United States Patent
Parupalli et al.

(10) Patent No.: US 11,962,261 B2
(45) Date of Patent: Apr. 16, 2024

(54) CROSS-OVER DISTORTIONLESS PULSE-WIDTH MODULATED (PWM)/LINEAR MOTOR CONTROL SYSTEM

(71) Applicant: CIRRUS LOGIC INTERNATIONAL SEMICONDUCTOR LTD., Edinburgh (GB)

(72) Inventors: Vamsikrishna Parupalli, Austin, TX (US); Mark May, Austin, TX (US); Eric B. Smith, Austin, TX (US); Zhong You, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 130 days.

(21) Appl. No.: 17/230,789

(22) Filed: Apr. 14, 2021

(65) Prior Publication Data

US 2022/0337181 A1 Oct. 20, 2022

(51) Int. Cl.
*H02P 5/46* (2006.01)
*G02B 7/09* (2021.01)
*G02B 27/64* (2006.01)
*H02P 7/03* (2016.01)
*H02P 7/29* (2016.01)
*H02P 7/292* (2016.01)

(52) U.S. Cl.
CPC .............. *H02P 7/29* (2013.01); *G02B 7/09* (2013.01); *G02B 27/646* (2013.01); *H02P 7/04* (2016.02); *H02P 7/292* (2013.01)

(58) Field of Classification Search
CPC .............. H02P 27/04; H02P 8/12; H02P 5/68
See application file for complete search history.

(56) References Cited

U.S. PATENT DOCUMENTS

| 5,550,450 A | 8/1996 | Palko et al. |
| 6,392,484 B1* | 5/2002 | Takita .................. H03F 3/217 330/10 |
| 6,995,537 B1 | 2/2006 | Plutowski et al. |

(Continued)

OTHER PUBLICATIONS

International Search Report and Written Opinion in PCT/US2022/22249 dated Jul. 7, 2022 (pp. 1-17 in pdf).

*Primary Examiner* — Kawing Chan
*Assistant Examiner* — Charles S Laughlin
(74) *Attorney, Agent, or Firm* — Mitch Harris, Atty at Law, LLC; Andrew M. Harris

(57) ABSTRACT

An electronic motor control system provides selectable linear and pulse-width modulated (PWM) operation without generating cross-over distortion. The system includes an output stage that has a pair of push-pull drivers each coupled to a terminal of the motor. The electronic motor control system also includes a pulse-width modulated (PWM) driver for providing pulse-width modulated drive signals to an input of the output stage when the pulse-width modulated mode is selected and a linear amplifier stage that provides a linear analog signal to the input of the output stage in linear mode, so that both drivers are operated to supply the current to the motor. In pulse-width modulated mode, a driver is selected for PWM operation, while the other driver is operated to supply a fixed voltage. A feedback control loop senses motor current and provides outputs to the pulse-width modulator and the linear amplifier stage.

19 Claims, 5 Drawing Sheets

(56) References Cited

U.S. PATENT DOCUMENTS

| | | |
|---|---|---|
| 9,219,414 B2 | 12/2015 | Shao |
| 9,735,574 B2 | 8/2017 | Tournatory et al. |
| 10,996,634 B2 | 5/2021 | Yao et al. |
| 11,070,177 B2 | 7/2021 | Singh et al. |
| 2014/0368949 A1* | 12/2014 | Sugie ................. G11B 19/2009 330/296 |
| 2019/0379389 A1* | 12/2019 | Parupalli .............. H04N 23/667 |

* cited by examiner

CROSS-OVER DISTORTIONLESS PULSE-WIDTH MODULATED (PWM)/LINEAR MOTOR CONTROL SYSTEM

BACKGROUND

1. Field of Disclosure

The field of representative embodiments of this disclosure relates to motor drivers and other power output electronics that selectably operate in pulse-width modulated (PWM) and linear modes. and in particular to motor drivers in which cross-over distortion is eliminated while maintaining a continuous feedback loop when the operating mode is changed.

2. Background

Motor controllers, audio amplifiers, and other power output drivers such as those for driving haptic feedback devices, may be provided with high efficiency using a class-D type output, or low distortion, noise and offset using a linear amplifier. In particular, for motor controllers, a pulse-width modulated (PWM) output stage has been used in combination with linear output motor control to provide high-efficiency for large excursions and low distortion and offset error by transitioning to a linear control once the motor-driven position is close to the commanded position or for functions such as maintaining image focus (auto-focus) or image stabilization. Such operation enhances accuracy by providing a less noisy environment when the system is in a linear operation mode, while providing high power efficiency for large excursions when the system is in the PWM operating mode.

However, when operating a fully-differential switch/amplifier, such as an H-bridge arrangement, while both PWM control and linear control may be implemented, the linear control is operated with class-B biasing, in order to match a closed-loop feedback transfer function of the PWM control in which one device on each side of the H-bridge is always off. Class-B biasing, by definition, introduces cross-over distortion that may be reduced, but not eliminated.

Therefore, it would be advantageous to operate a motor controller such that may operate selectively in PWM or linear mode without cross-over distortion.

SUMMARY

Improved motor driver operation is accomplished in electronic motor control systems, integrated circuits including the motor control systems and their methods of operation.

The electronic motor control system includes an output stage for supplying the current to the motor, which has a first push-pull driver coupled to a first output for coupling to a first terminal of the motor and a second push-pull driver coupled to a second output for coupling to a second terminal of the motor. A mode selection control circuit selects between a pulse-width modulated mode and a linear mode of the electronic motor controller. The electronic motor control system also includes a pulse-width modulator output stage for providing pulse-width modulated control signals to an input of the output stage when the mode selection control circuit selects the pulse-width modulated mode. In pulse-width modulated mode, a driver is selected according to a direction of the current supplied to the motor and is pulse-width modulated while the other driver is operated to supply a fixed voltage when the mode selection control circuit selects the pulse-width modulated mode. A linear amplifier stage provides a linear analog signal to the input of the output stage in linear mode, so that both drivers are operated to supply the current to the motor. A feedback control loop senses the current supplied to the motor and provides a first output to the pulse-width modulator and a second output to the linear amplifier stage.

In some embodiments, a first transfer function from an input to the selected one of the first push-pull driver or the second push-pull driver in the pulse-width modulated mode is made substantially equivalent to a second transfer function from the input to the combination of the first push-pull driver and the second push-pull driver in the linear mode, so that an output of a loop filter of the feedback control loop settles to approximately a same value after the mode selection control changes between the linear mode and the pulse-width modulated mode as a previous value of the output of the loop filter prior to the change.

The summary above is provided for brief explanation and does not restrict the scope of the claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure encompasses circuits and integrated circuits that include improved motor control systems and their method of operation. The electronic motor control systems include an output stage that supplies current to a motor, and which has a first push-pull driver coupled to a first output for coupling to a first terminal of the motor and a second push-pull driver coupled to a second output for coupling to a second terminal of the motor. A mode selection control circuit selects between a pulse-width modulated mode and a linear mode of the electronic motor controller. In pulse-width modulated mode, a driver is selected according to a direction of the current supplied to the motor and is pulse-width modulated to provide a single-ended class B driver, while the other driver is operated to supply a fixed voltage when the mode selection control circuit selects the pulse-width modulated mode. In linear mode, both drivers are operated to supply the current to the motor as a differential class AB amplifier. The resulting operation avoids cross-over distortion, as in the linear mode of operation, the output stage conducts current on either side of zero current output. While the following description is provided with reference to block diagrams, it is understood that the description included therein are applicable to a process that may be implemented, in part, by a digital signal processor executing a computer program product according to an embodiment of the disclosure as described in further detail below.

Figure 1:
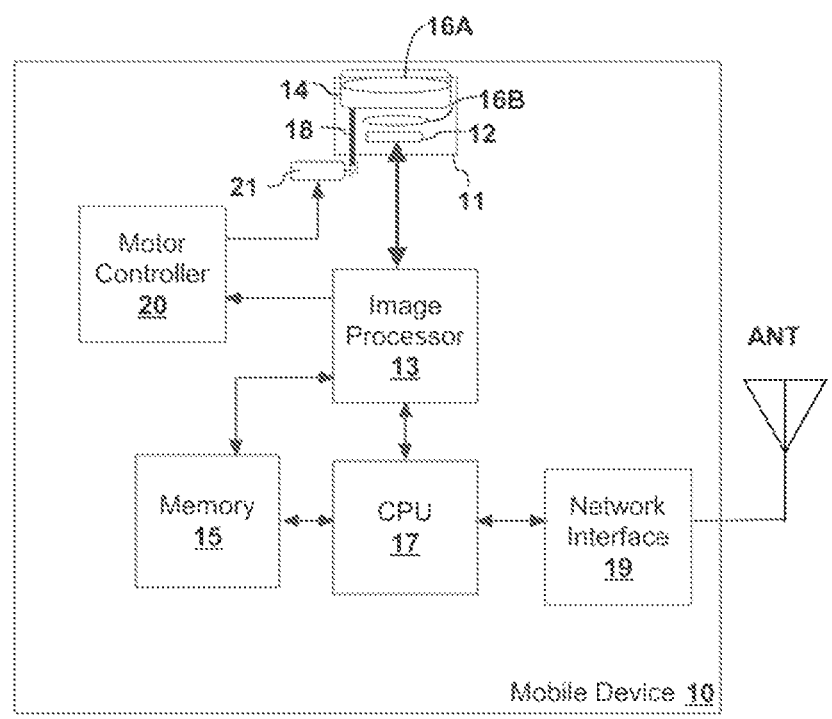
FIG. 1 is a block diagram illustrating a mobile device 10, in accordance with an embodiment of the disclosure.

Referring now to FIG. 1, a block diagram of an example mobile device 10 is shown, in accordance with an embodiment of the disclosure. Example mobile device 10 may be a wireless mobile telephone, tablet, notebook computer, or a similar device. Alternatively, mobile device may be a digital camera or other system that incorporates a position-controlled image sensor. Operation of mobile device 10 is controlled by a central processing unit (CPU) 17, which may be a microcontroller, microprocessor or other processor core, such as a processor core in a dedicated system-on-chip (SOC) implementation. CPU 17 is coupled to a memory 15 that stores program instructions forming a computer-program product, program data and other data such as media, including digital photographs. Memory 15 may include both non-volatile and dynamic storage elements. A network interface 19 provides for connection of mobile device 10 to a wireless network via an antenna ANT, but is not required for implementation of embodiments according to the disclosure, for example in a camera providing only a wired interface. A separate image processor 13 is also coupled to memory 15, and memory may comprise separate storage for program instructions forming another computer-program product, and data that may not be accessed directly by CPU 17. Image processor 13 provides an interface for receiving data from an image sensor 12 of a camera 11 within mobile device 10 and also provides an interface to a motor controller 20 that controls a motor 21 that positions a movable lens 16A, or multiple lenses, of camera 11, responsive to commands from image processor 13 that cause movement of a mount 14 via a mechanical linkage 18 coupled to motor 21. The commands are generally motor current commands to control the speed of the motor as computed by CPU 17 or image processor 13, which may provide zoom, auto-focus and image stabilization functions as described in further detail below. Another fixed lens 16B receives an image from movable lens 16A to produce an image of the subject of a photograph or other image processing subject on image sensor 12.

Figure 2A:
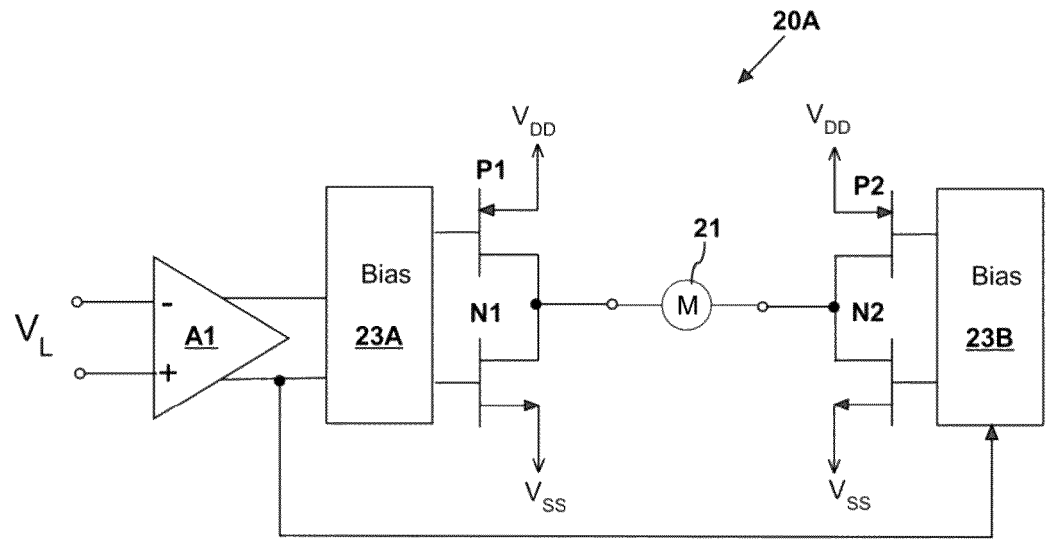
FIG. 2A is a block diagram illustrating an example output stage 20A of motor controller 20 of FIG. 1 operating in a linear operating mode and FIG. 2B is a block diagram illustrating an example output stage 20B of motor controller 20 of FIG. 1 in a pulse-width modulated (PWM) operating mode, in accordance with an embodiment of the disclosure.

Referring now to FIG. 2A, a simplified block diagram illustrating an example of an output stage 20A of motor controller 20 within mobile device 10 of FIG. 1 configured in a linear operating mode is shown, in accordance with an embodiment of the disclosure. An H-bridge circuit formed by transistors P1, P2, N1 and N2 are controlled by outputs of a differential amplifier A1 to provide operating current to motor 21. Bias circuits 23A, 23B set the quiescent operating current in respective sides of the H-bridge, i.e., quiescent current flowing from a positive power supply rail $V_{DD}$ through transistor P1 and through transistor N1 to a negative power supply rail $V_{SS}$, which may be ground, and quiescent current flowing from positive power supply rail $V_{DD}$ through transistor P1 and through transistor N2 to negative power supply rail $V_{SS}$. The bias of transistors P1, P2, N1 and N2 is set for class AB operation, so that when a loop filter output voltage $V_L$ provided to the input of an amplifier/pre-driver A1 that the input signals to the H-bridge through bias circuits 23A, 23B, has zero amplitude, a current is maintained flowing through each half of the H-bridge, avoiding cross-over distortion in the output signal provided to motor 21.

Figure 2B:
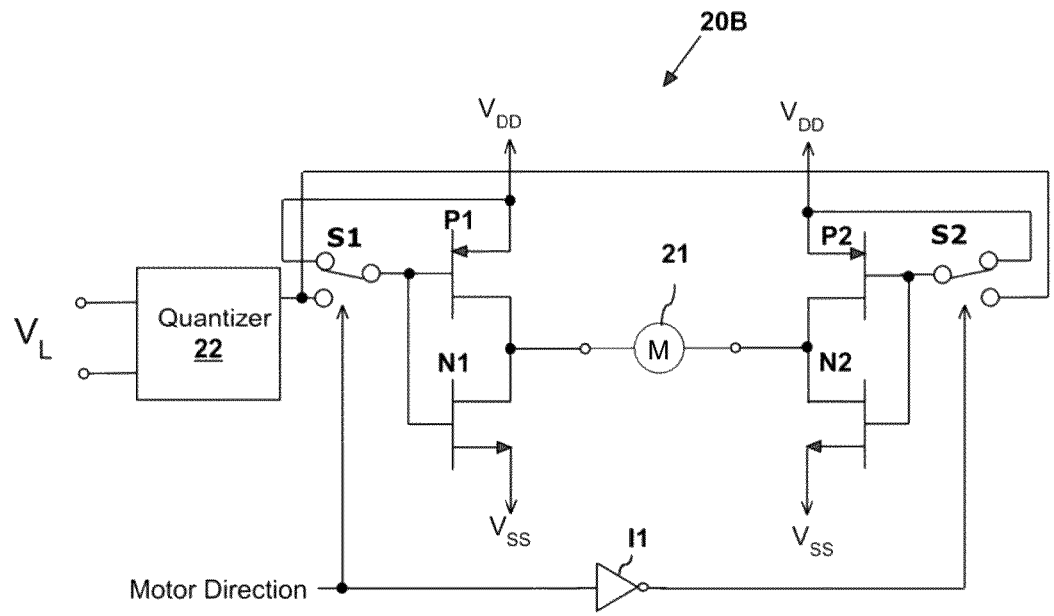

Referring now to FIG. 2B, a simplified block diagram illustrating an example of an output stage 20B of motor controller 20 within mobile device 10 of FIG. 1 configured in a pulse-width modulated (PWM) mode is shown, in accordance with an embodiment of the disclosure. A pair of switches S1, S2 select a left side or right side of the H-bridge circuit for PWM control by an output of a quantizer 22 that quantizes loop filter output voltage $V_L$ to provide operating current to motor 21. The other, unselected, side of the H-bridge has gate terminals of both transistors tied to power supply rail $V_{DD}$, so that the N-channel transistor (transistor N1 or transistor N2) is turned on and the P-channel transistor (transistor P1 or transistor P2) is turned off, thus the unselected side of the H-bridge will provide a fixed voltage close to the voltage of power supply rail $V_{SS}$. Selection of the modulated vs. fixed voltage side of the H-bridge circuit is controlled by a Motor Direction control signal, so that output stage 20B is operated in a single-ended mode, in which only one side of the H-bridge is modulated rather than using both sides of the H-bridge to differentially drive motor 21 in PWM mode. The disclosed architecture allows the H-bridge output driver formed by transistors P1, P2, N1 and N2 to be shared for both PWM mode and linear mode, rather than using separate linear mode drivers, which provides reduction of switching noise and allows the control loop to have the same response for the PWM mode as in the linear mode illustrated in FIG. 2A. In linear mode, the disclosed architecture of FIG. 2A and FIG. 2B also provides the ability to operate in linear mode across the full range of output voltage, i.e., to voltages near power supply rails $V_{DD}$ and $V_{SS}$ on opposite sides of the H-bridge if required, rather than at some lower signal amplitude.

Figure 3:
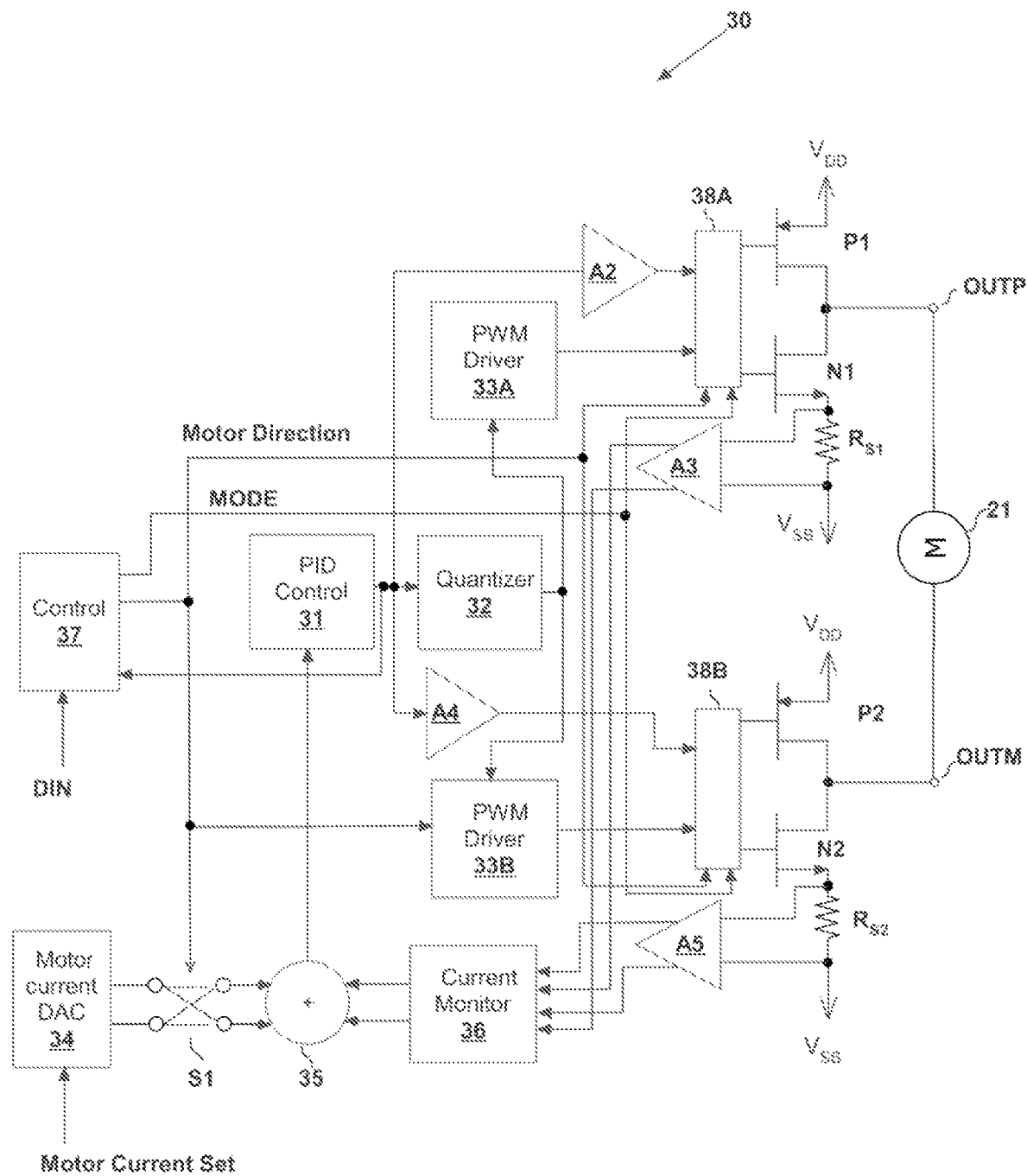
FIG. 3 is a simplified schematic diagram of an example motor control circuit 30 within motor controller 20 of FIG. 1, in accordance with an embodiment of the disclosure.

Referring now to FIG. 3, a simplified schematic diagram of an example motor control circuit 30 within motor controller 20 of FIG. 1 is shown, in accordance with an embodiment of the disclosure. Each half of the H-bridge formed by transistors P1, P2, N1 and N2 includes a current sense resistor $R_{S1}$, $R_{S2}$ that provide inputs to a current monitor circuit 36, via fully-differential amplifiers A3 and A5, respectively. In PWM mode, the motor current is sensed on the "sink" side, i.e., through the sense resistor $R_{S1}$ or $R_{S2}$ that is connected to the transistor N1 or N2 that is turned on to sink current through motor 21 that is provided by the other side of the H-bridge, since the current will be in only one direction. In linear mode, the voltages across both sense resistors $R_{S1}$, $R_{S2}$ is measured and effectively subtracted by current monitor circuit 36, which causes cancelation of measured class-AB bias current conducted by both sides of the H-bridge, while the motor current remains in the measurement, since only one of transistors N1 or N2 is conducting the motor current. Current monitor circuit 36 combines the outputs of fully-differential amplifiers A3 and A5 to provide a measure of the current delivered to motor 21, and a combiner 35 generates feedback signals from a differential output of current monitor circuit 36, which are provided as an input to a proportional integral-derivative (PID) control block 31. PID control block 31 corrects for the phase difference between the motor current through the inductive load of motor 21 and generates an output that provides an input to a quantizer 32, which generates PWM output signals that provide input to a pair of PWM drivers 33A, 33B. The outputs of PWM drivers 33A, 33B are provided as inputs to respective to selector blocks 38A, 38B.

Selector blocks 38A, 38B, include the functionality of switches S1, S2 described with reference to FIG. 2B above, as well as selection between providing the output of one of PWM drivers 33A, 33B to the side of the H-bridge that is being modulated when a control signal MODE is asserted, or providing the outputs of both of a pair of linear driver amplifiers A2, A4 to their corresponding side of the H-bridge when mode control signal MODE is de-asserted. Linear driver amplifiers A2, A4 also receive the output of PID control block 31, so that a common feedback loop is shared between linear and PWM mode drive. Linear driver amplifiers A2, A4 have a gain that compensates for the difference between the single-ended PWM signal generated by only one half of the H-bridge vs. the differential signaling during operation of the H-bridge in linear mode, e.g., an attenuation of ½. Selector blocks 38A, 38B, also include the bias resistors or active bias circuits that bias transistors P1, P2, N1 and N2 to provide Class AB bias when linear mode is selected, i.e., all of transistors P1, P2, N1 and N2 conduct a bias current in addition to signal current.

Input to example motor control circuit 30 within motor controller 20 of FIG. 1, is provided from CPU 17 or image processor 13 of FIG. 1, or both, and consists of digital input value Motor Current Set. Digital input value Motor Current Set is provided to a motor current DAC 34 that is coupled through cross-point switch S1, which interchanges the output signals of DAC 34 to provide negative values corresponding to a reverse motor direction when control signal Motor Direction is asserted. Control signal Motor Direction is controlled by a control circuit 37 that receives commands from a digital command input DIN coupled to one or both of CPU 17 and image processor 13 of FIG. 1 to select linear or PWM operating mode, initiate a motor current control command and set the motor direction.

Figure 4:
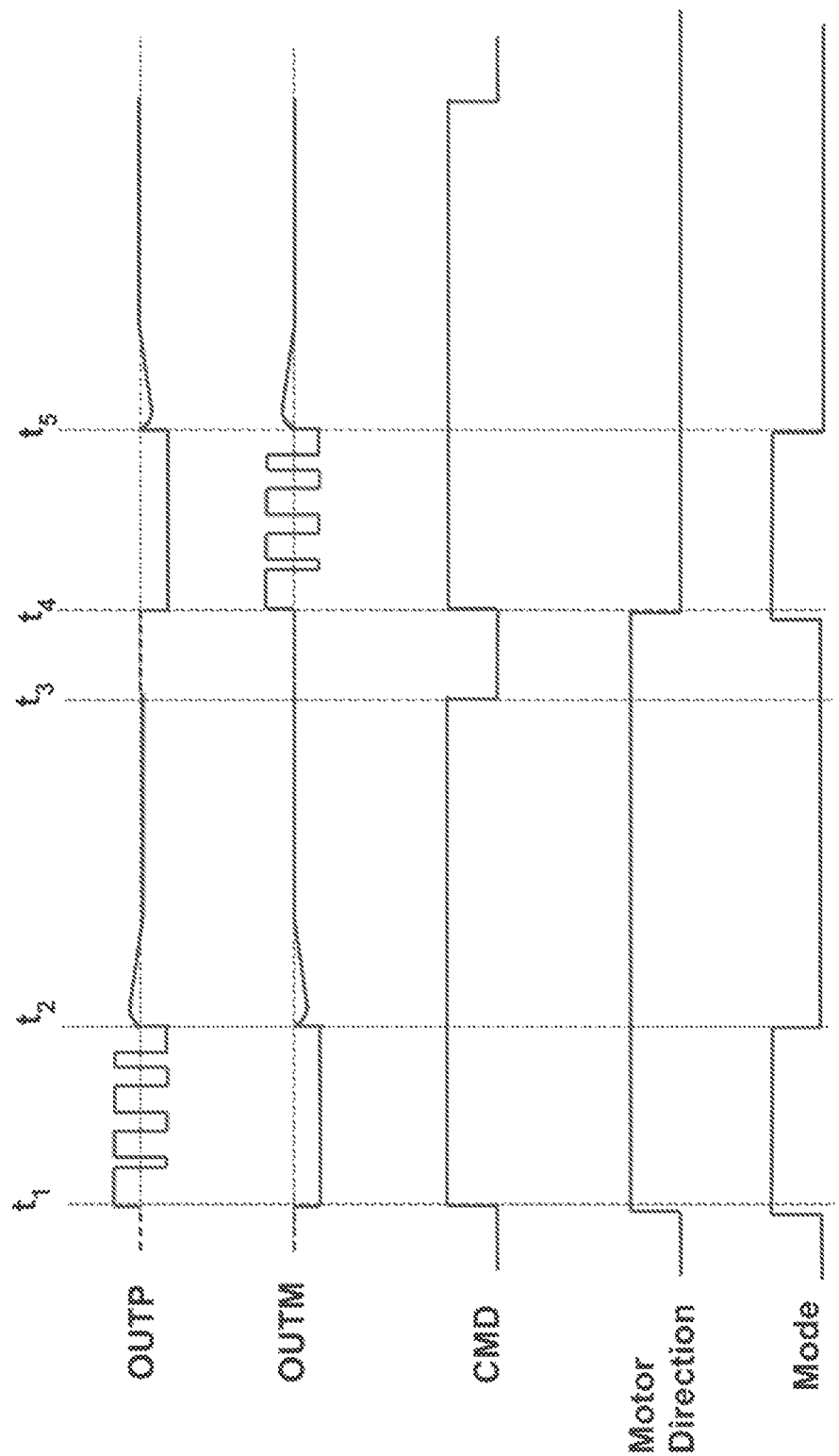
FIG. 4 is an example signal waveform diagram illustrating operation of motor control circuit 30 of FIG. 3, in accordance with an embodiment of the disclosure.

Referring now to FIG. 4, an example signal waveform diagram illustrating operation of motor control circuit 30 of FIG. 3 is shown, in accordance with an embodiment of the disclosure. At time $t_1$, a lens position command is received, represented by signal CMD, which illustrates the time period during which the command is valid. Output terminal OUTM is set to power supply rail $V_{SS}$ e.g., by turning transistor N2 on and transistor P2 off, in accordance with control signal Motor Direction. Output terminal OUTP is pulse-width modulated by operating transistors N1 and P1 according to the output of quantizer 32, in accordance with the state of control signal MODE. At time $t_2$, control signal MODE is de-asserted, for example, when the position of motor 21 nears the commanded position and a command is received to change the operating mode to linear. After time $t_2$, motor controller 20 operates in linear mode and output terminals OUTM and OUTP are both driven as the commanded position is reached and until the end of the control of position occurs at time $t_3$. At time $t_4$, another positioning command is received with an opposite state of control signal Motor Direction. Output terminal OUTM is pulse-width modulated by operating transistors N2 and P2 according to the output of quantizer 32, which causes output terminal OUTP to be set to power supply rail $V_{SS}$, e.g., by turning transistor P1 off and transistor N1 on. After time $t_5$, motor controller 20 operates in linear mode and output terminals OUTM and OUTP are both driven as the commanded position is reached.

Figure 5:
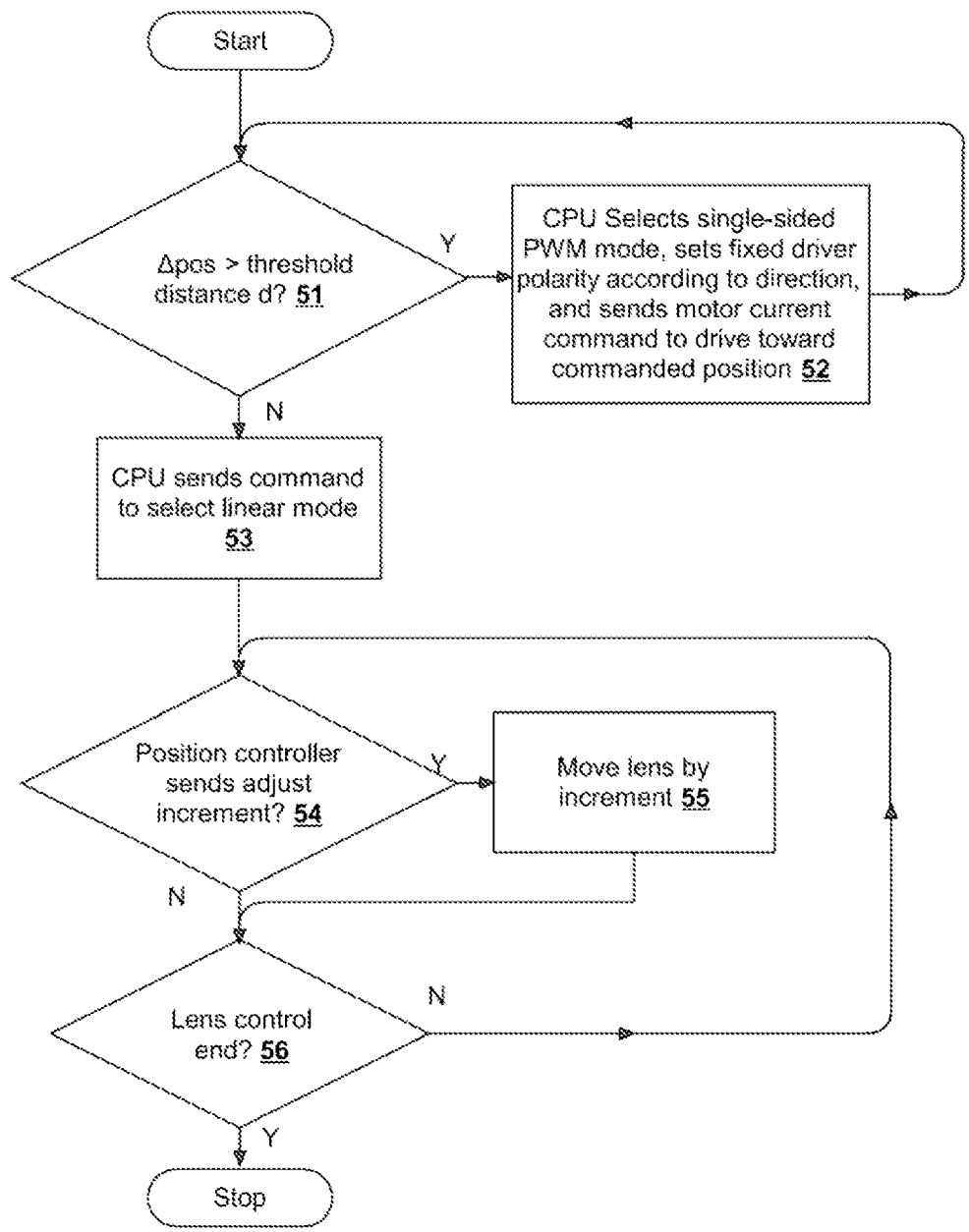
FIG. 5 is an example flowchart illustrating operation of mobile device 10 of FIG. 1, in accordance with an embodiment of the disclosure.

Referring now to FIG. 5, an example flowchart illustrating operation of mobile device 10 of FIG. 1 is shown, in accordance with an embodiment of the disclosure. While the difference in position Δpos between a desired position and the actual position of lens 16A is greater than a threshold distance d (decision 51), the motor proceeds to move the lens. Initially, single-sided PWM mode is selected with a fixed driver polarity voltage provided at one side of the H-bridge while the motor is driven toward the commanded position (step 52). Once the difference in position Δpos has reached threshold distance d, a mode change command is received causing selection of the linear mode and the motor is driven to the commanded position (step 53). If motor controller 20 receives a position increment command (decision 54), e.g., from an auto-focus module of the program executed by image processor 13 that has determined that camera 11 requires a focus adjustment or from an image stabilization module that has determined that the image is moving and requires a consequent focal length adjustment in addition to any image processing to compensate for movement, motor controller 20 moves lens 16A by the increment (step 55). Until the camera lens control ends (decision 56), steps 54-55 are repeated to maintain image focus.

As mentioned above, portions of the disclosed processes may be carried out by the execution of a collection of program instructions forming a computer program product stored on a non-volatile memory, but that also exist outside of the non-volatile memory in tangible forms of storage forming a computer-readable storage medium. The computer-readable storage medium may be, for example, but is not limited to, an electronic storage device, a magnetic storage device, an optical storage device, an electromagnetic storage device, a semiconductor storage device, or any suitable combination of the foregoing. Specific examples of the computer-readable storage medium includes the following: a hard disk, semiconductor volatile and non-volatile memory devices, a portable compact disc read-only memory (CD-ROM) or a digital versatile disk (DVD), a memory stick, a floppy disk or other suitable storage device not specifically enumerated. A computer-readable storage medium, as used herein, is not to be construed as being transitory signals, such as transmission line or radio waves or electrical signals transmitted through a wire. It is understood that blocks of the block diagrams described above may be implemented by computer-readable program instructions. These computer readable program instructions may also be stored in other storage forms as mentioned above and may be downloaded into a non-volatile memory for execution therefrom. However, the collection of instructions stored on media other than system non-volatile memory described above also form a computer program product that is an article of manufacture including instructions which implement aspects of the functions/actions specified in the block diagram block or blocks.

In summary, this disclosure shows and describes systems and integrated circuits implementing an electronic motor control system, and their methods of operation. The system includes an output stage for supplying the current to the motor. The output stage may have a first push-pull driver coupled to a first output for coupling to a first terminal of the motor and a second push-pull driver coupled to a second output for coupling to a second terminal of the motor. The system may include a mode selection control circuit for selecting between a pulse-width modulated mode and a linear mode of the electronic motor controller, and a pulse-width modulated (PWM) driver stage for providing pulse-width modulated drive signals to an input of the output stage when the mode selection control circuit selects the pulse-width modulated mode. The mode selection control circuit may select one of the first push-pull driver or the second push-pull driver in conformity with a direction of the current supplied to the motor, and the selected one of the first push-pull driver or the second push-pull driver may be pulse-width modulated while another one of the first push-pull driver or the second push-pull driver may be operated to supply a fixed voltage when the mode selection control circuit selects the pulse-width modulated mode. The system may include a linear amplifier stage for providing a linear analog signal to the input of the output stage when the mode selection control circuit selects the linear mode, so that both the first push-pull driver and the second push-pull driver may be operated to supply the current to the motor when the mode selection control circuit selects the linear mode. The system may also include a feedback control loop for sensing the current supplied to the motor and providing a first output to the pulse-width modulator and a second output to the linear amplifier stage.

In some example embodiments, the system may include an input for receiving a motor current control value, and a first transfer function from the input to the selected one of the first push-pull driver or the second push-pull driver when the mode selection control circuit selects the pulse-width modulated mode may be substantially equivalent to a second transfer function from the input to the combination of the first push-pull driver and the second push-pull driver when the mode selection control circuit selects the linear mode, so that an output of a loop filter of the feedback control loop settles to approximately a same value after the mode selection control changes between the linear mode and the pulse-width modulated mode as a previous value of the output of the loop filter prior to the change. In some example embodiments, the input may be a digital input for receiving a digital current control value, and the electronic motor control system may further include a digital-to-analog converter (DAC) for receiving the digital current control value and generating an analog output provided to the feedback control loop. In some example embodiments, the system may include a pulse-width modulator for providing an input to the pulse-width modulator output stage, a loop filter of the feedback control loop, a quantizer of the pulse-width modulator having an input coupled to a first output of the loop filter, so that an input of the linear amplifier stage is coupled to a second output of the loop filter, and a current sense block coupled to at least one of the output stage or the motor and having an output coupled to the feedback control loop. In some example embodiments, the system may include a position sensor that detects a position controlled by the motor and a processing subsystem for receiving an output of the position sensor and generating an output provided to an input of the feedback control loop. In some example embodiments, the position sensor may be an image sensor mechanically coupled to the motor, and the processing subsystem may include an image processor. In some example embodiments, the image processor may detect instability in an image provided by the image processor and controls the output provided to the input of the feedback control loop to stabilize the image. In some example embodiments, the image processor may detect a measure of a focus of an image provided by the image processor and control the output provided to the input of the feedback control loop to maintain a focus of the image. In some example embodiments, when the mode selection control selects the linear mode, the first push-pull driver and the second push-pull driver may be operated as class-AB linear drivers. In some example embodiments, when the mode selection control selects the linear mode, the first push-pull driver and the second push-pull driver may provide a signal swing that extends substantially over a range of voltage from a negative power supply rail supplied to the output stage to a positive power supply rail supplied to the output stage.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to a control system for supplying signals to a haptic device or an audio transducer.

What is claimed is:

1. An electronic motor control system, comprising:
an output stage for supplying the current to the motor, the output stage having a first push-pull driver coupled to a first output for coupling to a first terminal of the motor and a second push-pull driver coupled to a second output for coupling to a second terminal of the motor;
a mode selection control circuit for selecting between a pulse-width modulated mode and a linear mode of the electronic motor controller;
a pulse-width modulator output driver for providing pulse-width modulated drive signals to an input of the output stage when the mode selection control circuit selects the pulse-width modulated mode, wherein the mode selection control circuit selects one of the first push-pull driver or the second push-pull driver in conformity with a direction of the current supplied to the motor, and wherein the selected one of the first push-pull driver or the second push-pull driver is pulse-width modulated and another one of the first push-pull driver or the second push-pull driver is operated to supply a fixed voltage when the mode selection control circuit selects the pulse-width modulated mode;
a linear amplifier stage for providing a linear analog signal to the input of the output stage when the mode selection control circuit selects the linear mode, wherein both the first push-pull driver and the second push-pull driver are operated in combination to supply the current to the motor by simultaneous conduction of the current supplied to the motor through both the first push-pull driver and the second push-pull driver, so that the first push-pull driver and the second push-pull driver operate in combination as a class AB differential driver when the mode selection control circuit selects the linear mode; and
a feedback control loop for sensing the current supplied to the motor and providing a first output to the pulse-width modulator and a second output to the linear amplifier stage, wherein the feedback control loop includes a current monitor circuit that senses a first sink current conducted through the first push-pull driver and a second sink current conducted through the second push-pull driver, wherein the current monitor circuit, responsive to the mode selection control circuit selecting the pulse-width modulated mode generates the first output to the pulse-width modulator from a selected one of the first sink current or the second sink current corresponding to the another one of the first push-pull driver or the second-push pull driver, whereby the selected one of the first sink current or the second sink current is the current returned from the motor, and wherein responsive to the mode selection control circuit selecting the linear mode, the current monitor generates the second output from a difference between the first sink current and the second sink current to compensate for bias current flowing in the first push-pull driver and the second-push pull driver.

2. The electronic motor control system of claim 1, further comprising an input for receiving a motor current control value, wherein a first transfer function from the input to the selected one of the first push-pull driver or the second push-pull driver when the mode selection control circuit selects the pulse-width modulated mode is substantially equivalent to a second transfer function from the input to the combination of the first push-pull driver and the second push-pull driver when the mode selection control circuit selects the linear mode, such that an output of a loop filter of the feedback control loop settles to approximately a same value after the mode selection control changes between the linear mode and the pulse-width modulated mode as a previous value of the output of the loop filter prior to the change.

3. The electronic motor control system of claim 1, wherein the input is a digital input for receiving a digital current control value, and wherein the electronic motor control system further comprises a digital-to-analog converter (DAC) for receiving the digital current control value and generating an analog output provided to the feedback control loop.

4. The electronic motor control system of claim 1, further comprising:
   a pulse-width modulator for providing an input to the pulse-width modulator output stage;
   a loop filter of the feedback control loop;
   a quantizer of the pulse-width modulator having an input coupled to a first output of the loop filter, wherein an input of the linear amplifier stage is coupled to a second output of the loop filter; and
   a current sense block coupled to at least one of the output stage or the motor and having an output coupled to the feedback control loop.

5. The electronic motor control system of claim 1, further comprising:
   a position sensor that detects a position controlled by the motor; and
   a processing subsystem for receiving an output of the position sensor and generating an output provided to an input of the feedback control loop.

6. The electronic motor control system of claim 5, wherein the position sensor is an image sensor mechanically coupled to the motor, and wherein the processing subsystem includes an image processor.

7. The electronic motor control system of claim 6, wherein the image processor detects instability in an image provided by the image processor and controls the output provided to the input of the feedback control loop to stabilize the image.

8. The electronic motor control system of claim 6, wherein the image processor detects a measure of a focus of an image provided by the image processor and controls the output provided to the input of the feedback control loop to maintain a focus of the image.

9. The electronic motor control system of claim 1, wherein when the mode selection control selects the linear mode, the first push-pull driver and the second push-pull driver provide a signal swing that extends substantially over a range of voltage from a negative power supply rail supplied to the output stage to a positive power supply rail supplied to the output stage.

10. A method of providing electronic control of a motor, comprising:
   supplying the current to the motor from an output stage having a first push-pull driver coupled to a first output for coupling to a first terminal of the motor and a second push-pull driver coupled to a second output for coupling to a second terminal of the motor;
   selecting between a pulse-width modulated mode and a linear mode of operation;
   responsive to selecting pulse-width modulated mode, providing pulse-width modulated control signals to an input of the output stage, selecting a one of the first push-pull driver or the second push-pull driver in conformity with a direction of the current supplied to the motor for pulse-width modulation and selecting another one of the first push-pull driver or the second push-pull driver to supply a fixed voltage;
   responsive to selecting the linear mode of operation, providing a linear analog signal to the input of the output stage, wherein both the first push-pull driver and the second push-pull driver are operated in combination to supply the current to the motor by simultaneous conduction of the current supplied to the motor through both the first push-pull driver and the second push-pull driver, so that the first push-pull driver and the second push-pull driver operate in combination as a class AB differential driver; and
   sensing the current supplied to the motor and providing a first feedback output to the pulse-width modulator and a second feedback output to the linear amplifier stage, wherein the sensing the current supplied to the motor is performed by a current monitor that, senses a first sink current conducted through the first push-pull driver and a second sink current conducted through the second push-pull driver, wherein the current monitor, responsive to selecting the pulse-width modulated mode, generates the first output to the pulse-width modulator from a selected one of the first sink current or the second sink current corresponding to the another one of the first push-pull driver or the second-push pull driver, whereby the selected one of the first sink current or the second sink current is the current returned from the motor, and wherein responsive to selecting the linear mode, the current monitor generates the second output from a difference between the first sink current and the second sink current to compensate for bias current flowing in the first push-pull driver and the second-push pull driver.

11. The method of claim 10, further comprising receiving a motor current control value at an input, wherein a first transfer function from the input to the selected one of the first push-pull driver or the second push-pull driver when the selecting selects the pulse-width modulated mode is substantially equivalent to a second transfer function from the input to the combination of the first push-pull driver and the second push-pull driver when the selecting selects the linear mode, such that an output of a loop filter of a feedback control loop that provides the first feedback output and the second feedback output settles to approximately a same value after the selecting changes selection between the linear mode and the pulse-width modulated mode as a previous value of the output of the loop filter prior to the change.

12. The method of claim 10, further comprising:
receiving a digital current control value at a digital input; and
converting the digital current control value with a digital-to-analog converter (DAC) to an analog output provided to the feedback control loop.

13. The method of claim 10, further comprising:
filtering the second feedback output with a loop filter; and
quantizing an output of the loop filter to generate the pulse-width modulated control signals.

14. The method of claim 10, further comprising:
detecting a position controlled by the motor; and
generating an output provided to an input of the feedback control loop in conformity with the detected position.

15. The method of claim 14, wherein the detecting a position is performed by an image sensor mechanically coupled to the motor, and wherein the generating an output is performed by an image processor.

16. The method of claim 15, further comprising:
the image processor detecting an instability in an image provided by the image processor; and
controlling the output provided to the input of the feedback control loop to stabilize the image.

17. The method of claim 15, further comprising:
the image processor detecting a measure of a focus of an image provided by the image processor; and
controlling the output provided to the input of the feedback control loop to maintain a focus of the image.

18. The method of claim 10, wherein when the selecting selects the linear mode, the first push-pull driver and the second push-pull driver provide a signal swing that extends substantially over a range of voltage from a negative power supply rail supplied to the output stage to a positive power supply rail supplied to the output stage.

19. An electronic motor control system, comprising:
an output stage for supplying the current to the motor and having a first push-pull driver and a second push-pull driver, wherein the output stage has outputs for coupling to terminals of the motor;
a drive stage for providing inputs to the push-pull drivers that operates in a pulse-width modulated mode or a linear mode, wherein, in the linear mode, the driver stage operates the output stage so that both the first push-pull driver and the second push-pull driver are operated in combination to supply the current to the motor by simultaneous conduction of the current through both the first push-pull driver and the second push-pull driver, so that the first push-pull driver and the second push-pull driver operate in combination as a class AB differential driver, and wherein in the pulse-width modulated mode, the drive stage operates the output stage so that one of the push-pull drivers has a pulse-width modulated output provided to a first terminal of the motor and another one of the push-pull drivers is turned fully-on in one polarity to provide a fixed voltage to the other terminal of the motor; and
a feedback control loop for sensing the current supplied to the motor and providing at least one output to the drive stage, wherein the feedback control loop includes a current monitor circuit that senses a first sink current conducted through the first push-pull driver and a second sink current conducted through the second push-pull driver, wherein the current monitor circuit, responsive to the drive stage operating in the pulse-width modulated mode, generates the at least one output from a selected one of the first sink current or the second sink current corresponding to the another one of the first push-pull driver or the second-push pull driver, whereby the selected one of the first sink current or the second sink current is the current returned from the motor, and wherein responsive to the drive circuit operating in the linear mode, the current monitor generates the at least one output from a difference between the first sink current and the second sink current to compensate for bias current flowing in the first push-pull driver and the second-push pull driver.

* * * * *